(12) United States Patent
Yamamura

(10) Patent No.: US 11,151,881 B2
(45) Date of Patent: Oct. 19, 2021

(54) PARKING ASSIST DEVICE

(71) Applicant: AISIN SEIKI KABUSHIKI KAISHA, Kariya (JP)

(72) Inventor: Naoki Yamamura, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 355 days.

(21) Appl. No.: 16/057,983

(22) Filed: Aug. 8, 2018

(65) Prior Publication Data

US 2019/0066514 A1 Feb. 28, 2019

(30) Foreign Application Priority Data

Aug. 29, 2017 (JP) .............................. JP2017-163954

(51) Int. Cl.
| | |
|---|---|
| *G08G 1/16* | (2006.01) |
| *B60W 30/06* | (2006.01) |
| *B62D 15/02* | (2006.01) |
| *G06K 9/00* | (2006.01) |
| *G08G 1/14* | (2006.01) |

(52) U.S. Cl.
CPC ............ *G08G 1/168* (2013.01); *B60W 30/06* (2013.01); *B62D 15/028* (2013.01); *B62D 15/0285* (2013.01); *G06K 9/00671* (2013.01); *G06K 9/00812* (2013.01); *G08G 1/143* (2013.01); *G06K 2209/01* (2013.01)

(58) Field of Classification Search
CPC ................ B62D 15/027; B62D 15/028; B62D 15/0285; B62D 15/029; G08G 1/168; G08G 1/146; G08G 1/143; B60W 30/06; B60Q 9/005; G06K 9/00812; G06K 9/00671; G06K 2209/01
See application file for complete search history.

(56) References Cited

U.S. PATENT DOCUMENTS

| | | | | |
|---|---|---|---|---|
| 6,587,760 | B2 * | 7/2003 | Okamoto ............... | B60Q 9/005 340/932.2 |
| 6,611,744 | B1 * | 8/2003 | Shimazaki ............... | B60R 1/00 180/168 |

(Continued)

FOREIGN PATENT DOCUMENTS

| | | |
|---|---|---|
| JP | 2006-224778 A | 8/2006 |
| JP | 2008-096362 A | 4/2008 |

(Continued)

*Primary Examiner* — Mussa A Shaawat
(74) *Attorney, Agent, or Firm* — Sughrue Mion, PLLC

(57) ABSTRACT

A parking assist device includes: a storage unit that stores a position of a specific parking space which is one of parking spaces where a vehicle is capable of being parked; a detection unit that detects a parking space from a captured image obtained by imaging the vicinity of the vehicle by an imaging device; a determination unit that determines that the detected parking space is the specific parking space in a case where a distance between the position of the detected parking space and the position of the specific parking space is equal to or smaller than a first threshold value; and a display process unit that causes the detected parking space to be displayed on a display unit while being highlighted in a case where it is determined that the detected parking space is the specific parking space.

7 Claims, 9 Drawing Sheets

(56) References Cited

U.S. PATENT DOCUMENTS

| | | | |
|---|---|---|---|
| 7,012,549 B2 * | 3/2006 | Mizusawa | B62D 15/028 340/932.2 |
| 7,069,128 B2 * | 6/2006 | Iwama | B62D 15/027 701/36 |
| 7,363,130 B2 * | 4/2008 | Sakakibara | G08G 1/161 701/36 |
| 7,375,651 B2 * | 5/2008 | Shimazaki | B62D 15/0275 180/199 |
| 8,140,209 B2 | 3/2012 | Adachi et al. | |
| 9,122,569 B2 | 9/2015 | Ishibashi et al. | |
| 9,384,664 B2 | 7/2016 | Torii et al. | |
| 2002/0041239 A1 * | 4/2002 | Shimizu | B62D 15/027 340/932.2 |
| 2002/0191078 A1 * | 12/2002 | Okamoto | G06T 5/006 348/148 |
| 2004/0153243 A1 * | 8/2004 | Shimazaki | B62D 15/0275 701/300 |
| 2005/0002544 A1 * | 1/2005 | Winter | G08G 1/14 382/104 |
| 2006/0080005 A1 * | 4/2006 | Lee | B60Q 1/22 701/1 |
| 2006/0190147 A1 * | 8/2006 | Lee | B62D 15/028 701/26 |
| 2008/0100472 A1 * | 5/2008 | Mizusawa | B62D 15/0275 340/932.2 |
| 2008/0158011 A1 * | 7/2008 | Yamanaka | B62D 15/0275 340/932.2 |
| 2010/0211267 A1 * | 8/2010 | Shimazaki | B62D 15/028 701/42 |
| 2010/0283633 A1 * | 11/2010 | Becker | B60R 1/00 340/932.2 |
| 2010/0321211 A1 * | 12/2010 | Ko | G08G 1/163 340/932.2 |
| 2012/0092191 A1 * | 4/2012 | Stefik | G08G 1/148 340/932.2 |
| 2012/0191337 A1 * | 7/2012 | Schoenherr | B62D 15/027 701/400 |
| 2013/0063601 A1 * | 3/2013 | Wakabayashi | B60R 1/00 348/148 |
| 2013/0120572 A1 * | 5/2013 | Kwon | B62D 15/0295 348/148 |
| 2013/0132102 A1 * | 5/2013 | Andrade | G06Q 50/30 705/1.1 |
| 2014/0176348 A1 * | 6/2014 | Acker, Jr. | G08G 1/146 340/932.2 |
| 2014/0176349 A1 * | 6/2014 | Smullin | G08G 1/142 340/932.2 |
| 2014/0249742 A1 * | 9/2014 | Krivacic | G06Q 10/02 701/400 |
| 2015/0062341 A1 * | 3/2015 | Nakata | B62D 15/0295 348/148 |
| 2015/0179070 A1 * | 6/2015 | Sandbrook | G08G 1/149 340/932.2 |
| 2015/0344028 A1 * | 12/2015 | Gieseke | B62D 15/028 701/1 |
| 2016/0207526 A1 * | 7/2016 | Franz | B62D 15/028 |
| 2016/0267794 A1 * | 9/2016 | Cogill | G08G 1/149 |
| 2016/0297312 A1 * | 10/2016 | Tsukamoto | B60L 53/124 |
| 2017/0118307 A1 * | 4/2017 | Beaurepaire | G08G 1/143 |
| 2017/0355307 A1 * | 12/2017 | Ha | B60Q 9/005 |
| 2018/0043905 A1 * | 2/2018 | Kim | B60W 50/10 |
| 2018/0099661 A1 * | 4/2018 | Bae | G08G 1/146 |
| 2018/0253916 A1 * | 9/2018 | Muthusamy | G08G 1/148 |
| 2019/0084618 A1 * | 3/2019 | Numata | B60R 21/00 |
| 2019/0176888 A1 * | 6/2019 | Lee | G05D 1/0225 |
| 2020/0180510 A1 * | 6/2020 | Suzuki | B60R 1/00 |
| 2020/0242924 A1 * | 7/2020 | Publicover | G08G 1/096758 |

FOREIGN PATENT DOCUMENTS

| | | |
|---|---|---|
| JP | 2009-083680 A | 4/2009 |
| JP | 2009-205191 A | 9/2009 |
| JP | 2012-166686 A | 9/2012 |
| JP | 2014-034322 A | 2/2014 |
| JP | 2015-074255 A | 4/2015 |
| JP | 2015-227139 A | 12/2015 |
| WO | 2007/058325 A1 | 5/2007 |

* cited by examiner

FIG.4

| POSITION | ROAD SURFACE LETTER | 161 |
|---|---|---|
| LATITUDE : a1, LONGITUDE : b1 | 24 | |

FIG.5

| DATE AND TIME OF PARKING | POSITION | ROAD SURFACE LETTER |
|---|---|---|
| 2017/7/1 9:00 | LATITUDE : a1, LONGITUDE : b1 | 24 |
| 2017/7/2 10:00 | LATITUDE : a2, LONGITUDE : b2 | 26 |
| 2017/7/3 9:00 | LATITUDE : a1, LONGITUDE : b1 | 24 |
| ⋮ | ⋮ | ⋮ |
| 2017/7/31 11:00 | LATITUDE : c1, LONGITUDE : d1 | 11 |

(162)

| POSITION | ROAD SURFACE LETTER | PRIORITY RANK |
|---|---|---|
| LATITUDE : a1, LONGITUDE : b1 | 24 | 1 |
| LATITUDE : a2, LONGITUDE : b2 | 26 | 2 |

(a)

(b)

PARKING ASSIST DEVICE

CROSS REFERENCE TO RELATED APPLICATIONS

This application is based on and claims priority under 35 U.S.C. § 119 to Japanese Patent Application 2017-163954, filed on Aug. 29, 2017, the entire contents of which are incorporated herein by reference.

TECHNICAL FIELD

Embodiments of this disclosure relate to a parking assist device.

BACKGROUND DISCUSSION

In the related art, there is a known parking assist device that detects parking spaces from an image obtained by imaging the vicinity of a vehicle and displays frame images or the like on a vicinity image which shows the state of the vicinity of the vehicle such that a user (driver) can figure out the positions of the detected parking spaces. In such a parking assist device, a target parking space is determined from the detected parking spaces based on selection performed by the user or a positional relationship between the vehicle and the parking spaces. JP 2015-074255A (Reference 1) is an example of the related art.

However, the detected parking spaces may not be a place where the user wants to park. Therefore, in the case of the related art as described above, a parking space that is not intended to be selected by the user may be erroneously selected as a target parking space.

Thus, a need exists for a parking assist device which is not susceptible to the drawback mentioned above.

SUMMARY

A parking assist device according to an aspect of this disclosure includes a storage unit that stores a position of a specific parking space which is one of parking spaces where a vehicle is capable of being parked; a detection unit that detects a parking space from a captured image which is obtained by imaging the vicinity of the vehicle by an imaging device; a determination unit that determines that the detected parking space is the specific parking space in a case where a distance between the position of the detected parking space and the position of the specific parking space is equal to or smaller than a first threshold value; and a display process unit that causes the detected parking space to be displayed on a display unit while being highlighted in a case where it is determined that the detected parking space is the specific parking space.

BRIEF DESCRIPTION OF THE DRAWINGS

The foregoing and additional features and characteristics of this disclosure will become more apparent from the following detailed description considered with the reference to the accompanying drawings, wherein:

FIG. 4 is a diagram illustrating an example of a data configuration of parking space information according to Embodiment 1;

FIG. 5 is a diagram illustrating an example of a data configuration of parking history information according to Embodiment 1;

DETAILED DESCRIPTION

Embodiment 1

Generally, there is a parking lot such as a parking lot of a multiple-dwelling complex or a contracted parking lot in which one of a plurality of parking spaces is determined in advance as a parking space for parking of a user's vehicle. In a case where a vehicle is parked in such a parking lot, a parking assist device according to the present embodiment can prevent the user from erroneously selecting a target parking space by highlighting the parking space for parking of the user's vehicle. Hereinafter, an example in which the parking assist device according to the present embodiment is installed into a vehicle 1 will be described.

Figure 1:
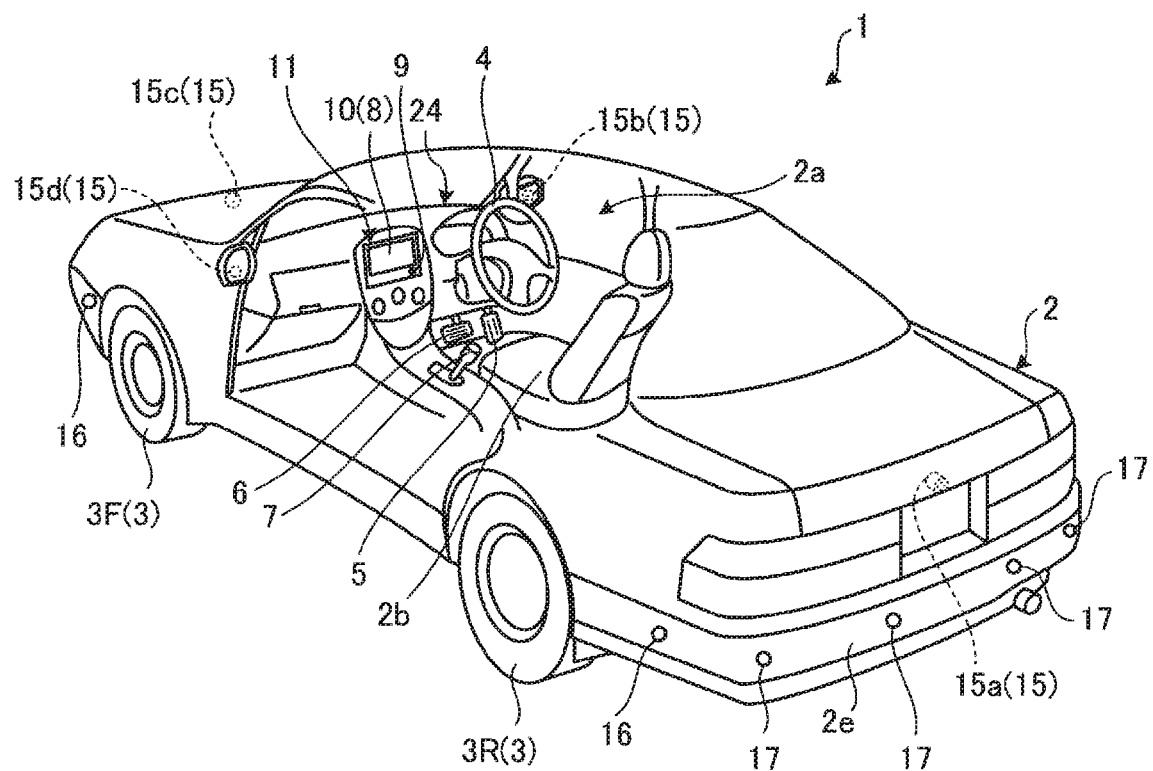
FIG. 1 is an exemplary perspective view illustrating a portion of a vehicle cabin of a vehicle according to Embodiment 1 in a see-though manner.

FIG. 1 is an exemplary perspective view illustrating a portion of a vehicle cabin 2a of the vehicle 1 according to the present embodiment in a see-though manner. In the present embodiment, the vehicle 1 into which the parking assist device is installed may be, for example, an automobile that has an internal combustion engine (not shown) as a drive source, that is, an internal combustion engine automobile, or an automobile that has an electric motor as a drive source, that is, an electric automobile, a fuel cell automobile, or the like. Alternatively, the vehicle 1 may be a hybrid automobile that has both of an internal combustion engine and an electric motor as drive sources and may be an automobile that has other drive sources. In addition, it is possible to install various transmissions into the vehicle 1 and it is possible to install various devices, for example, a system, a component, or the like that is needed to drive an internal combustion engine or an electric motor into the vehicle 1.

As illustrated in FIG. 1, a vehicle body 2 constitutes the vehicle cabin 2a on which an occupant (not shown) rides. In the vehicle cabin 2a, a steering unit 4, an accelerating unit 5, a braking unit 6, a gear shifting unit 7, and the like are provided to face a seat 2b for a driver as the occupant.

The steering unit 4 is, for example, a steering wheel (handle) that protrudes from a dashboard 24. In addition, the accelerating unit 5 is, for example, an accelerator pedal that is positioned below the feet of the driver. In addition, the braking unit 6 is, for example, a brake pedal that is positioned below the feet of the driver. In addition, the gear shifting unit 7 is, for example, a shift lever that protrudes from a center console. The steering unit 4, the accelerating unit 5, the braking unit 6, and the gear shifting unit 7 are not limited to those described above.

In addition, in the vehicle cabin 2a, a display device 8 or a voice output device 9 is provided. The voice output device 9 is, for example, a speaker. In addition, the display device 8 is, for example, a liquid crystal display (LCD), an organic electroluminescent display (OLED), or the like. The display device 8 is an example of a display unit in the present embodiment.

In addition, the display device 8 is covered by, for example, a transparent operation input unit 10 such as a touch panel. The occupant can input an operation by pressing a position on the operation input unit 10 that corresponds to an image displayed on a display screen of the display device 8 with a finger or the like to operate the operation input unit 10.

The display device 8, the voice output device 9, the operation input unit 10, and the like are provided in a monitor device 11, for example. The monitor device 11 may include an operation input unit (not shown) such as a switch, a dial, a joystick, or a push button. In addition, a voice output device (not shown) may be provided at a position in the vehicle cabin 2a while being separate from the monitor device 11 and voice may be output from the voice output device 9 of the monitor device 11 and another voice output device. The monitor device 11 may also function as a navigation system or an audio system, for example. In addition, in the vehicle cabin 2a, a display device (display unit) other than the display device 8 may be provided.

As illustrated in FIG. 1, the vehicle body 2 is provided with a plurality of imaging units (imaging devices) 15. For example, the vehicle body 2 is provided with four imaging units 15a to 15d. The imaging unit 15 is, for example, a digital camera into which an imaging element such as a charge coupled device (CCD) or a CMOS image sensor (CIS) is built. The imaging unit 15 can output video data at a predetermined frame rate. The imaging unit 15 sequentially images an environment around the vehicle body 2 including a road surface where the vehicle 1 can move and a region where the vehicle 1 can be parked and outputs the captured image as captured image data.

The imaging unit 15a is positioned on a rear end portion 2e of the vehicle body 2, for example. The imaging unit 15b is positioned on a right end portion of the vehicle body 2. The imaging unit 15c is positioned on a front end portion of the vehicle body 2, that is, an end portion that is on the front side in a vehicle front-rear direction, for example. The imaging unit 15d is positioned on a left end portion of the vehicle body 2, that is, an end portion that is on the left side in a vehicle width direction. The number of imaging units 15 and installation positions thereof are not limited to those described above.

In addition, as illustrated in FIG. 1, the vehicle 1 is, for example, a four-wheeled automobile and includes two right and left front vehicle wheels 3F and two right and left rear vehicle wheels 3R. Any of the four vehicle wheels 3 may be configured to be able to be steered. In addition, the type, the number, the layout, or the like of a device related to the driving of the vehicle wheels 3 of the vehicle 1 can be set in various ways.

In addition, as illustrated in FIG. 1, the vehicle body 2 is provided with a plurality of distance measuring units 16 and 17. Each of the distance measuring units 16 and 17 is, for example, SONAR (SONAR sensor, ultrasonic detection device) that emits an ultrasonic wave and receives a reflected wave thereof. The number and positions of the distance measuring units 16 and 17 provided for the vehicle body 2 are not limited to those in an example illustrated in FIG. 1.

Figure 2:
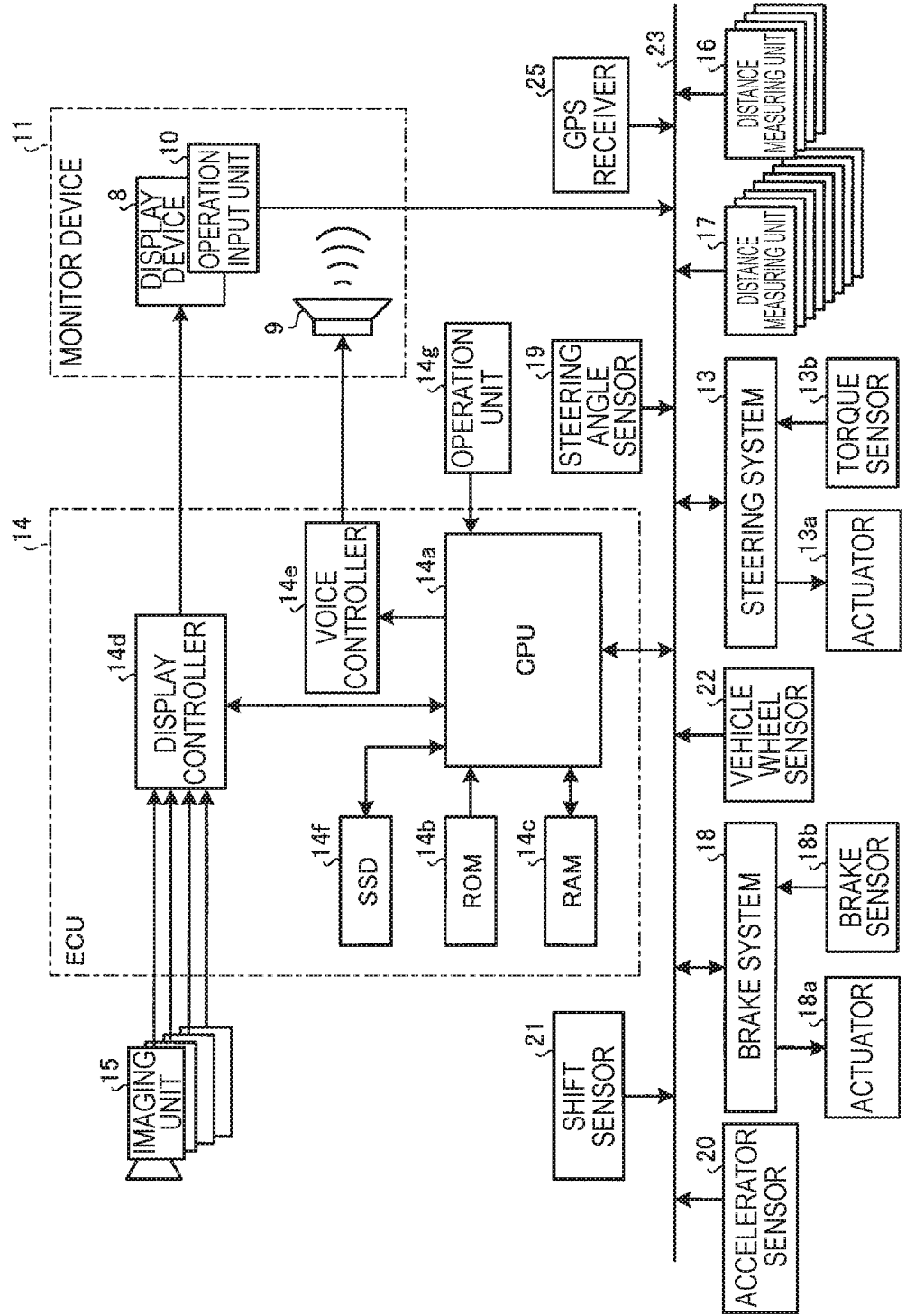
FIG. 2 is a diagram illustrating an example of a hardware configuration of a vehicle control system including an ECU according to Embodiment 1.

FIG. 2 is a diagram illustrating an example of a hardware configuration of a vehicle control system 100 including an electronic control unit (ECU) 14 according to the present embodiment. As illustrated in FIG. 2, in the vehicle control system 100, in addition to the ECU 14, the monitor device 11, a steering system 13, and the distance measuring units 16 and 17, a brake system 18, a steering angle sensor 19 (angle sensor), an accelerator sensor 20, a shift sensor 21, a vehicle wheel sensor 22, a global positioning system (GPS) receiver 25, and the like are electrically connected to each other via an in-vehicle network 23 as an electric telecommunication line. The in-vehicle network 23 is configured as, for example, a controller area network (CAN).

The ECU 14 controls the steering system 13, the brake system 18, and the like by transmitting a control signal through the in-vehicle network 23. In addition, the ECU 14 receives the results of detection performed by a torque sensor 13b, a brake sensor 18b, the steering angle sensor 19, the distance measuring units 16 and 17, the accelerator sensor 20, the shift sensor 21, the vehicle wheel sensor 22, and the like and an instruction signal (control signal, operation signal, input signal, data) of the operation input unit 10 or the like via the in-vehicle network 23. The ECU 14 is an example of a parking assist device in the present embodiment.

The ECU 14 includes, for example, a central processing unit (CPU) 14a, a read only memory (ROM) 14b, a random access memory (RAM) 14c, a display controller 14d, a voice controller 14e, a solid state drive (SSD) (flash memory) 14f, and the like.

The CPU 14a reads a program that is installed and stored in a non-volatile storage device such as the ROM 14b and executes a calculation process according to the program. In addition, the CPU 14a acquires an operation signal which is generated when an operation unit 14g is operated and signals from various sensors.

The display controller 14d controls image output with respect to the display device 8. In addition, the voice controller 14e mainly executes processing of audio data output from the voice output device 9, which is a part of the calculation process in the ECU 14.

The CPU 14a, the ROM 14b, the RAM 14c, and the like may be integrated into the same package. In addition, the ECU 14 may be configured such that other logic arithmetic processors such as a digital signal processor (DSP), a logic circuit, or the like is used instead of the CPU 14a. In addition, a hard disk drive (HDD) may be provided instead of the SSD 14f and the SSD 14f and the HDD may be provided separately from the ECU 14.

The operation unit 14g is configured as a push button, a switch, or the like for example and outputs the operation signal. The operation unit 14g is provided in the dashboard 24, for example.

In addition, the steering system 13 steers at least two vehicle wheels 3. The steering system 13 includes an actuator 13a and the torque sensor 13b. The steering system 13 is, for example, an electric power steering system, a steer-by-wire (SBW) system, or the like.

In addition, the brake system 18 includes an actuator 18a and the brake sensor 18b. The brake system 18 is, for example, an anti-lock brake system (ABS), an antiskid brake system (electronic stability control (ESC)), an electric brake system that increases a braking force (executes brake assisting operation), a brake-by-wire (BBW) system, or the like. The brake system 18 applies a braking force to the vehicle wheels 3 and the vehicle 1 via the actuator 18a.

The steering angle sensor 19 is a sensor that measures the steering amount (angle of rotation) of the steering unit 4 and is configured by using, for example, a hall element.

The accelerator sensor 20 is, for example, a sensor that measures the position of a movable portion of the accelerating unit 5.

The shift sensor 21 is, for example, a sensor that measures the position of the movable portions of the gear shifting unit 7. The shift sensor 21 measures the positions of a lever, an arm, a button, and the like which are the movable portions. The shift sensor 21 may include a displacement sensor. In addition, the shift sensor 21 may be configured as a switch.

The vehicle wheel sensor 22 is a sensor that measures the amount of rotation of the vehicle wheels 3 or the number of times of rotation of the vehicle wheels 3 per unit time and is configured by using, for example, a hall element. The vehicle wheel sensor 22 transmits the number of vehicle wheel speed pulses, which indicates the detected number of times of rotation, to the ECU 14 as a sensor value. The vehicle wheel sensor 22 is provided in the brake system 18 in some cases.

The GPS receiver 25 acquires the current position of the vehicle 1 based on a radio wave received from a satellite.

The configurations and arrangement of the various sensors and actuators described above and the way in which the various sensors and actuators are electrically connected are merely an example and can be set (modified) in various ways.

Figure 3:
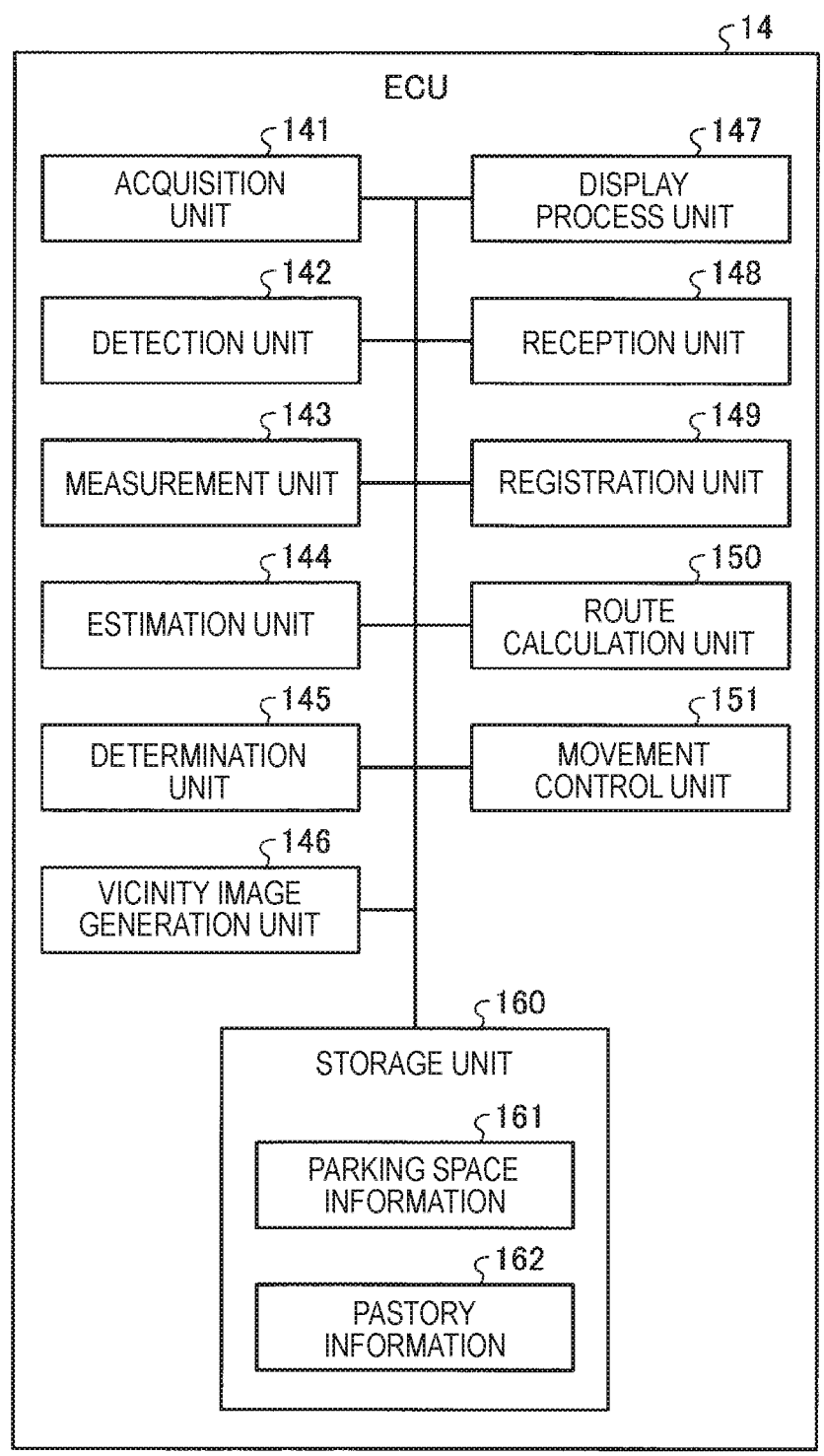
FIG. 3 is a block diagram illustrating an example of a functional configuration of the ECU according to Embodiment 1.

FIG. 3 is a block diagram illustrating an example of a functional configuration of the ECU 14 according to the present embodiment. As illustrated in FIG. 3, the ECU 14 is provided with an acquisition unit 141, a detection unit 142, a measurement unit 143, an estimation unit 144, a determination unit 145, a vicinity image generation unit 146, a display process unit 147, a reception unit 148, a registration unit 149, a route calculation unit 150, a movement control unit 151, and a storage unit 160.

The configuration of each of the acquisition unit 141, the detection unit 142, the measurement unit 143, the estimation unit 144, the determination unit 145, the vicinity image generation unit 146, the display process unit 147, the reception unit 148, the registration unit 149, the route calculation unit 150, and the movement control unit 151 is realized when the CPU 14a executes a program stored in the ROM 14b. The configuration may be realized by a hardware circuit.

The storage unit 160 is configured with a storage device such as the SSD 14f, for example. The storage unit 160 stores parking space information 161 and parking history information 162.

FIG. 4 is a diagram illustrating an example of the data configuration of the parking space information 161 according to the present embodiment. As illustrated in FIG. 4, the parking space information 161 is information in which the position of a specific parking space and a road surface letter are correlated with each other. In the present embodiment, the specific parking space is a parking space where the vehicle 1 is preferentially parked and is, for example, a parking space in a parking lot of a multiple-dwelling complex or a contracted parking lot, which the user of the vehicle 1 contracts for.

The position included in the parking space information 161 is the position of the specific parking space and is indicated by the latitude and longitude coordinates of the center of the specific parking space, for example.

The road surface letter is a letter such as a number or an alphabet character written on a road surface (ground surface) of the specific parking space. The road surface letter may be stored as letter information as illustrated in FIG. 4 and may be stored as image data obtained by imaging the road surface letter. In FIG. 4, only one item of the parking space information 161 is registered. However, a plurality of items of the parking space information 161 may be registered.

FIG. 5 is a diagram illustrating an example of the data configuration of the parking history information 162 according to the present embodiment. As illustrated in FIG. 5, the parking history information 162 is information in which the date and time of parking of the vehicle 1 (date and time of parking), the position of a parking space where the vehicle 1 is parked, and a road surface letter written on a road surface of the parking space where the vehicle 1 is parked are correlated with each other. The parking history information 162 corresponding to a predetermined period of time (for example, past one month) is stored in the storage unit 160. Alternatively, the parking history information 162 corresponding to past ten times of parking, that is, ten items of the parking history information 162 may be stored in the storage unit 160. The storage period of the parking history information 162 and the number of items of the parking history information 162 stored are not limited to those described above.

Referring again to FIG. 3, the acquisition unit 141 acquires the current position of the vehicle 1 from the GPS receiver 25. In addition, the acquisition unit 141 acquires a captured image, which is obtained by imaging the vicinity of the vehicle 1, from the imaging units 15.

The detection unit 142 detects a parking space (parking region) where the vehicle 1 can be parked from the captured image acquired by the acquisition unit 141. For example, the detection unit 142 detects the parking space by detecting a partition line, a curbstone, a step, other vehicles, or the like from the captured image through image processing such as edge detection. In the present embodiment, the acquisition unit 141 detects a parking space positioned beside the vehicle 1. In addition, the detection unit 142 detects a road surface letter written on a road surface of the parking space from the captured image acquired by the acquisition unit 141.

The measurement unit 143 measures a distance between the parking space detected by the detection unit 142 and the vehicle 1. Hereinafter, the distance between the parking space detected by the detection unit 142 and the vehicle 1 will be referred to as a first distance. For example, the measurement unit 143 measures the first distance by measuring a distance between the center of the detected parking space and the imaging unit 15 from the captured image acquired by the acquisition unit 141 through image processing. A method of measuring the first distance is not limited to this.

The estimation unit 144 estimates the position of the parking space detected by the detection unit 142 from the current position of the vehicle 1 and the first distance measured by the measurement unit 143. The position of the detected parking space is indicated by the latitude and longitude of the center of the parking space, for example.

The determination unit 145 determines whether the parking space detected by the detection unit 142 is the specific parking space stored in the storage unit 160. More specifically, the determination unit 145 determines that the detected parking space is the specific parking space in a case where a distance between the position of the parking space which is estimated by the estimation unit 144 and the position of the specific parking space which is included in the parking space information 161 is equal to or smaller than a first threshold value and the road surface letter on the road surface of the detected parking space and the road surface letter in the specific parking space which is included in the parking space information 161 coincide with each other.

Specifically, the determination unit 145 determines whether the distance between the position of the parking space which is estimated by the estimation unit 144 and the position of the specific parking space which is included in the parking space information 161 is equal to or smaller than the first threshold value. The first threshold value is, for example, 1 m. In a case where the position of the specific parking space is "latitude: a1, longitude: b1" as illustrated in FIG. 4, the determination unit 145 determines whether a distance between the position as described above and the position of the detected parking space is equal to or smaller than 1 m. The value of the first threshold value is not limited to the value described above. Hereinafter, the distance between the position of the parking space which is estimated by the estimation unit 144 and the position of the specific parking space which is included in the parking space information 161 will be referred to as a second distance.

In addition, the determination unit 145 determines whether the road surface letter written on the road surface of the detected parking space coincides with the road surface letter in the specific parking space which is included in the parking space information 161. For example, the determination unit 145 determines that the road surface letters coincide with each other in a case where a number or an alphabet character of the road surface letter detected by the detection unit 142 is the same as a number or an alphabet character of the road surface letter in the specific parking space and is included in the parking space information 161.

Alternatively, the determination unit 145 may determine whether an image of the road surface letter in the specific parking space and an image that is on the road surface of the detected parking space coincide with each other by a method such as pattern matching. In addition, the determination unit 145 may calculate the degree of similarity between the image of the road surface letter in the specific parking space and the image on the road surface of the detected parking space and may determine that the road surface letters coincide with each other in a case where the degree of similarity is equal to or greater than a predetermined threshold value.

In the present embodiment, the determination unit 145 determines whether the detected parking space is the specific parking space based on the position of the detected parking space and the road surface letters. However, the determination unit 145 may determine whether the detected parking space is the specific parking space or not based on only the position of the detected parking space.

The vicinity image generation unit 146 generates a vicinity image that shows the state of the vicinity of the vehicle 1 from the captured image of the imaging units 15. For example, the vicinity image generation unit 146 generates a bird's-eye view image (plan image, top view) of the vicinity of the vehicle 1 as seen from above, as an example of the vicinity image. The bird's-eye view image is generated when four kinds of image data, which is acquired from the imaging units 15 provided on the front, rear, left, and right sides of the vehicle 1, is subject to various kinds of image processing such as viewpoint conversion and synthesis.

The vicinity image used in the embodiment is not limited to the bird's-eye view image. For example, the vicinity image may be a front side image (front view) illustrating the state of the front side of the vehicle 1 only, a lateral side image (side view) illustrating the state of the right and left sides of the vehicle 1 only, and a rear side image (rear view) illustrating the state of the rear side of the vehicle 1 only.

The display process unit 147 causes the vicinity image generated by the vicinity image generation unit 146 to be displayed on the display device 8 of the monitor device 11. In addition, the display process unit 147 causes a frame image (parking frame), which represents the parking space detected by the detection unit 142, to be displayed such that the frame image is superimposed on the vicinity image displayed on the display device 8.

In addition, the display process unit 147 causes a parking space that is one of parking spaces detected by the detection unit 142 and that is determined as the specific parking space by the determination unit 145 to be displayed while being highlighted. For example, the display process unit 147 causes a highlighted frame image that represents the parking space determined as the specific parking space to be displayed such that the highlighted frame image is superimposed on the vicinity image. Hereinafter, the frame image that represents the parking space determined as the specific parking space will be referred to as a "highlighted frame" and a frame image that represents a parking space other than the specific parking space will be referred to as an "ordinary frame". Both of the highlighted frame and the ordinary frame will be referred to as a "frame" in a case where the highlighted frame and the ordinary frame are not particularly distinguished from each other.

For example, in a case where the ordinary frame is a single-line frame formed of thin lines, the highlighted frame is a double-line frame formed of thick lines. The way in which the highlighted frame is displayed is not limited to this as long as the highlighted frame is more easily visually recognized than the ordinary frame. For example, the display process unit 147 may cause the highlighted frame to be displayed with a color different from that of the ordinary frame. In addition, the display process unit 147 may cause the specific parking space to be highlighted with another display method. For example, the display process unit 147 may cause a message (letter) or a symbol to be displayed in an area of a parking space determined as the specific parking space in the vicinity image.

The reception unit 148 receives a user's operation via an operation signal acquired from the operation unit 14g. For example, the reception unit 148 receives an operation for starting parking assist. In addition, the reception unit 148 receives a user's operation of selecting (determining) a target parking space via the operation unit 14g. For example, when the user operates the operation unit 14g in a case where the vicinity image and a frame representing a parking space are displayed on the display device 8, the reception unit 148 receives the user's operation as an operation of selecting the parking space represented by the frame displayed on the vicinity image as the target parking space. The target parking space is a target position to which the movement control unit 151 (which will be described later) causes the vehicle 1 to move and at which the vehicle 1 is parked.

In addition, the reception unit 148 may receive a user's operation input via the operation input unit 10 or the like instead of the operation unit 14g. For example, in a case where the reception unit 148 receives a user's operation of pressing an area inside a frame of a parking space displayed on the display device 8 via the operation input unit 10, the parking space represented by the pressed frame may be determined as the target parking space.

In addition, the reception unit 148 receives a user's operation of registering the specific parking space. More specifically, the reception unit 148 receives a registration operation of registering a parking space where the vehicle 1 is parked as the specific parking space in a case where the user presses the operation unit 14g with the vehicle 1 parked in the parking space. In addition, the reception unit 148 may receive an operation of registering the specific parking space by receiving an operation of pressing an operation button displayed on the display device 8 or a user's operation on a handle.

In addition, the reception unit 148 may receive an operation of deleting the specific parking space registered in the parking space information 161 of the storage unit 160. For example, the reception unit 148 may receive an operation of deleting data of the parking space information 161 via the operation button or the like displayed on the display device 8. In addition, in a case where the parking space information 161 includes a plurality of specific parking spaces, the reception unit 148 may receive an operation of selecting a specific parking space to be deleted.

The registration unit 149 registers the position of a specific parking space and a road surface letter written on a road surface of the specific parking space in the storage unit 160 as the parking space information 161 such that the position of the specific parking space and the road surface letter are correlated with each other. More specifically, in a case where the reception unit 148 receives a registration operation performed by the user, the registration unit 149 registers the position of a parking space where the vehicle 1 is parked and a road surface letter written on a road surface of the parking space with each other in the storage unit 160 such that the position of the parking space and the road surface letter are correlated with each other. The road surface letter written on the road surface of the parking space where the vehicle 1 is parked is detected by the detection unit 142 from the captured image that is captured by the imaging unit 15 while the vehicle 1 is being parked and the road surface letter is transmitted to the registration unit 149.

In addition, even when the registration operation is not performed by the user, the registration unit 149 registers the position of a parking space, in which the vehicle 1 is parked a number of times equal to or greater than a second threshold value within a predetermined past period of time, and a road surface letter written on a road surface of the parking space in the storage unit 160 such that the position of the parking space and the road surface letter are correlated with each other. In the present embodiment, the predetermined past period of time is, for example, past one month. The second threshold value is, for example, ten.

Specifically, the registration unit 149 counts the number of times the vehicle 1 is parked within the past one month for each position, that is, the number of times of parking for each position from the parking history information 162 stored in the storage unit 160. In a case where a position with the number of times of parking equal to or greater than the second threshold value is in the parking history information 162, the registration unit 149 registers the position and a road surface letter corresponding to the position in the storage unit 160 as the parking space information 161. The registration unit 149 may perform the registration as described above for each time a certain period of time elapses and may perform the registration for each time the vehicle 1 is parked. The certain period of time is, for example, one month. However, the length of the certain period of time is not limited to this.

The predetermined past period of time and the second threshold value described above are merely examples and are not limited to those described above. In addition, the registration unit 149 may register a position at which the vehicle 1 is parked a number of times equal to or greater than the second threshold value as the position of the specific parking space regardless of the date and time of parking at a time point at which the vehicle 1 is parked a predetermined number of times. For example, the registration unit 149 may register a position at which the vehicle 1 is parked seven or more times out of ten times of parking in the past as the position of the specific parking space. In this case, the second threshold value is seven. The second threshold value may be appropriately set according to a storage time limit or the like of the parking history information 162.

When the reception unit 148 receives the operation of selecting the target parking space, the route calculation unit 150 calculates a moving route of the vehicle 1 to the target parking space.

In addition, the movement control unit 151 executes steering control based on the moving route calculated by the route calculation unit 150 to cause the vehicle 1 to move (to be guided) to the target parking space. A method of calculating the moving route and moving the vehicle 1 is not limited.

Figure 6:
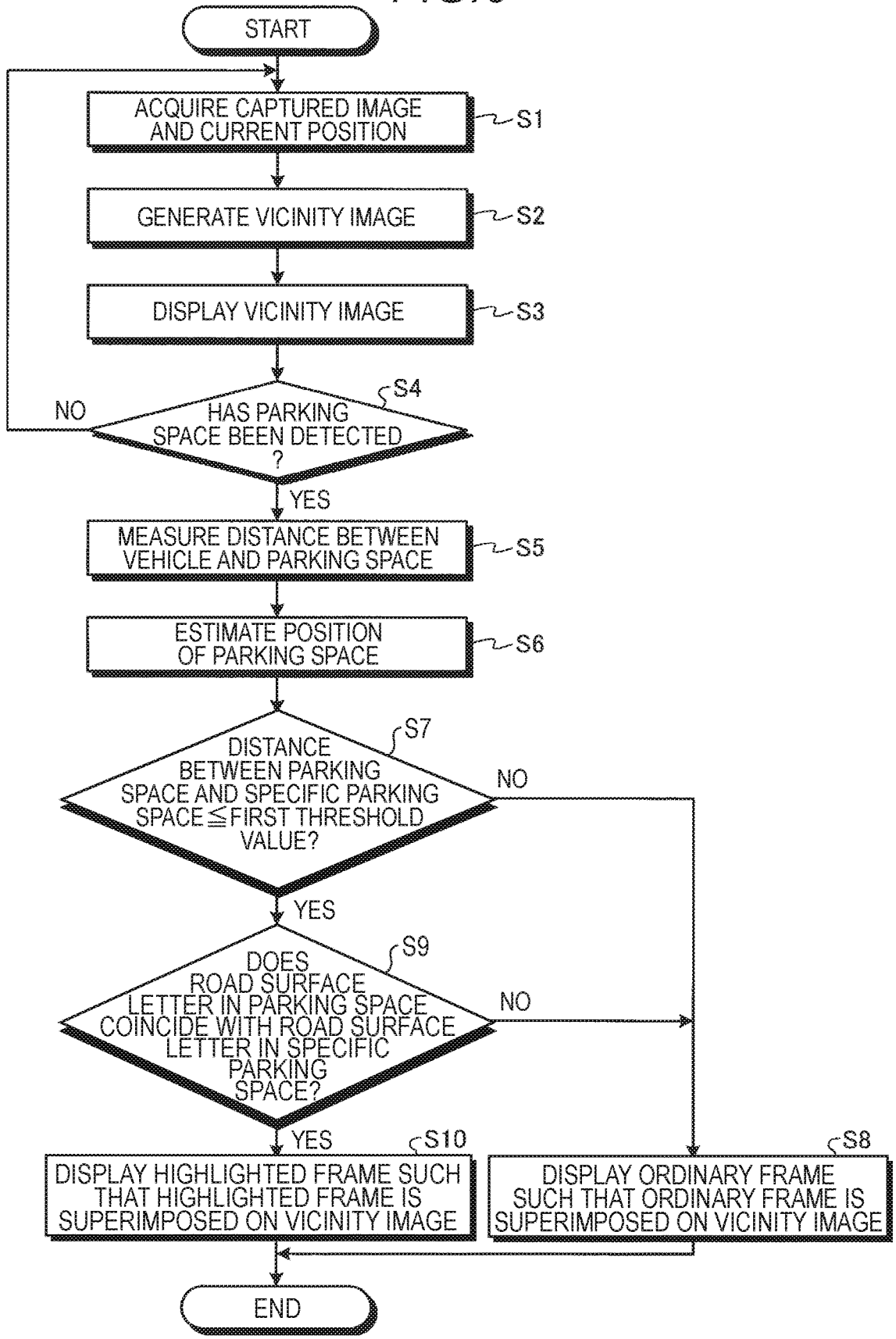
FIG. 6 is a flowchart illustrating an example of the procedure of a parking space display process according to Embodiment 1.

Next, a parking space display process in the present embodiment according to the ECU 14 configured as described above will be described. FIG. 6 is a flowchart illustrating an example of the procedure of a parking space display process according to Embodiment 1. The process illustrated in the flowchart is started in a case where the reception unit 148 receives the user's operation of starting the parking assist.

The acquisition unit 141 acquires the current position of the vehicle 1 from the GPS receiver 25. In addition, the acquisition unit 141 acquires the captured image, which is obtained by imaging the vicinity of the vehicle 1, from the imaging units 15 (S1).

The vicinity image generation unit 146 generates the vicinity image that shows the state of the vicinity of the vehicle 1 from the captured image of the imaging units 15 (S2).

The display process unit 147 causes the vicinity image generated by the vicinity image generation unit 146 to be displayed on the display device 8 of the monitor device 11 (83).

The detection unit 142 detects a parking space where the vehicle 1 can be parked from the captured image acquired by the acquisition unit 141. In a case where the parking space is not detected by the detection unit 142 from the captured image (S4 "No"), the process returns to S1.

In a case where the parking space is detected by the detection unit 142 from the captured image (S4 "Yes"), the measurement unit 143 measures a distance (first distance) between the parking space detected by the detection unit 142 and the vehicle 1 (S5).

Next, the estimation unit 144 estimates the position of the detected parking space from the current position of the vehicle 1 and the first distance measured by the measurement unit 143 (S6).

Next, the determination unit 145 determines whether a distance (second distance) between the position of the parking space which is estimated by the estimation unit 144 and the position of the specific parking space which is included in the parking space information 161 is equal to or smaller than the first threshold value (S7).

Figures 7, 8:
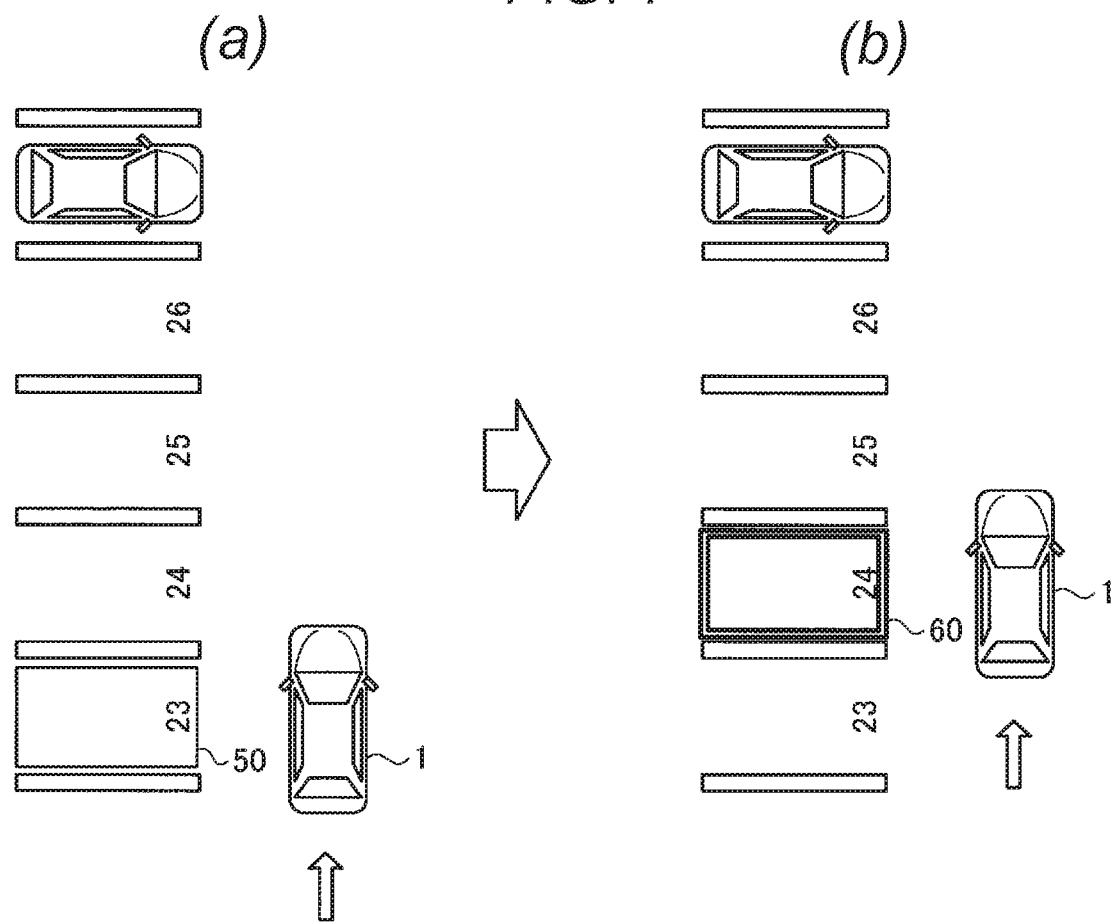
FIG. 7 is a view illustrating an example of the way in which a frame is displayed while being superimposed on a vicinity image according to Embodiment 1.
FIG. 8 is a diagram illustrating an example of a data configuration of parking space information according to Embodiment 2.

In a case where the second distance is greater than the first threshold value (S7 "No"), the determination unit 145 determines that the detected parking space is not the specific parking space. In this case, the display process unit 147 causes the ordinary frame, which represents the detected parking space, to be displayed such that the ordinary frame is superimposed on the vicinity image displayed on the display device 8 (S8). FIG. 7 is a view illustrating an example of the way in which a frame is displayed while being superimposed on the vicinity image according to the present embodiment. In an example illustrated in (a) of FIG. 7, the parking space detected beside the vehicle 1 is not the specific parking space. In this case, as illustrated in (a) of FIG. 7, the display process unit 147 causes an ordinary frame 50 to be displayed such that the ordinary frame 50 is superimposed on the vicinity image. Accordingly, the user can easily figure out that the currently detected parking space is not the specific parking space. In this case, the user can continue detection of other parking spaces by moving the vehicle 1 or the like.

Referring again to the flowchart in FIG. 6, in a case where the second distance is equal to or smaller than the first threshold value (S7 "Yes"), the determination unit 145 determines whether a road surface letter written on a road surface of the detected parking space coincides with the road surface letter in the specific parking space which is included in the parking space information 161 (S9). In a case where the road surface letter written on the road surface of the detected parking space does not coincide with the road surface letter in the specific parking space (S9 "No"), the determination unit 145 determines that the detected parking space is not the specific parking space. In this case, the display process unit 147 executes a process in S8.

In addition, in a case where the road surface letter written on the road surface of the detected parking space coincides with the road surface letter in the specific parking space (S9 "Yes"), the determination unit 145 determines that the detected parking space is the specific parking space. In this case, the display process unit 147 causes the highlighted frame which represents the parking space determined as the specific parking space to be displayed such that the highlighted frame is superimposed on the vicinity image displayed on the display device 8 (S10).

In an example illustrated in (b) of FIG. 7, the vehicle 1 has moved from the position thereof in (a) in a traveling direction. In (b) of FIG. 7, a distance (second distance) between the position of a parking space detected beside the vehicle 1 and the position of the specific parking space which is included in the parking space information 161 is equal to or smaller than the first threshold value and a road surface letter "24" of the detected parking space coincides with the road surface letter "24" of the specific parking space. In this case, as illustrated in (b) of FIG. 7, the display process unit 147 causes a highlighted frame 60 to be displayed such that the highlighted frame 60 is superimposed on the vicinity image. Since the display process unit 147 causes the display device 8 to be displayed in this manner, the user can easily figure out that the specific parking space has been detected. When the user operates the operation unit 14g in a case where the highlighted frame 60 is displayed, the reception unit 148 receives the user's operation as an operation of selecting a parking space represented by a frame displayed on the vicinity image as the target parking space. Therefore, in a parking lot of a multiple-dwelling complex or the like, it is possible to select a parking space which the user contracts for as the target parking space.

As described above, according to the ECU 14 in the present embodiment, in a case where it is determined that the detected parking space is the specific parking space, the parking space is displayed on the display device 8 while being highlighted. Therefore, the user can easily recognize the specific parking space and it is possible to prevent the user from erroneously selecting the target parking space.

In addition, according to the ECU 14 in the present embodiment, since the first threshold value is used when determining whether the detected parking space is the specific parking space, an error in the result of detection of the current position of the vehicle 1 or an error the result of estimation of the position of the detected parking space can be somewhat allowed.

Furthermore, according to the ECU 14 in the present embodiment, since the reception unit 148 receives an operation of inputting the position of the specific parking space and the storage unit 160 stores the position, it is possible to set a parking space as the specific parking space in accordance with the desire of the user. Therefore, according to the ECU 14 in the present embodiment, the user can register in advance a parking space or the like which the user contracts for and thus there is a further improvement in convenience.

Furthermore, according to the ECU 14 in the present embodiment, since the position of a parking space, in which the vehicle 1 is parked a number of times equal to or greater than the second threshold value within a predetermined past period of time is registered in the storage unit 160 as the specific parking space, it is possible to register the specific parking space without a registration operation performed by the user and thus a load on the user can be reduced.

Furthermore, the ECU 14 in the present embodiment determines that the detected parking space is the specific parking space in a case where a distance between the position of the detected parking space and the position of the specific parking space is equal to or smaller than the first threshold value and the road surface letter written on the road surface of the detected parking space coincides with the road surface letter written on the road surface of the specific parking space. Therefore, according to the ECU 14 in the present embodiment, it is possible to determine whether the detected parking space is the specific parking space with higher accuracy.

Embodiment 2

In Embodiment 1, the position of the specific parking space and the road surface letter are stored as the parking space information 161 such that the position and the road surface letter are correlated with each other. Furthermore, in the ECU 14 according to the present embodiment, a priority rank is set for each specific parking space and each parking space is highlighted in a stepwise manner according to the priority rank thereof.

The configuration of the vehicle 1 in the present embodiment and the hardware configuration of the vehicle control system 100 including the ECU 14 in the present embodiment are the same as the configurations in Embodiment 1, which have been described with reference to FIGS. 1 and 2.

In addition, the ECU 14 in the present embodiment is provided with the acquisition unit 141, the detection unit 142, the measurement unit 143, the estimation unit 144, the determination unit 145, the vicinity image generation unit 146, the display process unit 147, the reception unit 148, the registration unit 149, the route calculation unit 150, the movement control unit 151, and the storage unit 160 as with the functional configuration in Embodiment 1, which has been described with reference to FIG. 3. The acquisition unit 141, the detection unit 142, the measurement unit 143, the estimation unit 144, the vicinity image generation unit 146, the reception unit 148, the route calculation unit 150, and the movement control unit 151 in the present embodiment have the same functions as in Embodiment 1.

The storage unit 160 in the present embodiment stores parking space information 1161 and the parking history information 162. The parking history information 162 is the same as that in Embodiment 1.

FIG. 8 is a diagram illustrating an example of the data configuration of the parking space information 1161 according to the present embodiment. As illustrated in FIG. 8, the parking space information 1161 in the present embodiment is information in which the positions of specific parking spaces, road surface letters, and the priority ranks of the specific parking spaces are correlated with each other.

The priority rank "1" illustrated in FIG. 8 means that the priority rank of a corresponding specific parking space ranks first and the corresponding specific parking space has the highest priority level. The priority rank in the present embodiment is an example of a priority level. Instead of the priority rank, priority levels such as "high", "middle", "low", and the like may be stored while being correlated with the specific parking spaces.

The registration unit 149 has a function of setting the priority ranks of the specific parking spaces in addition to the function as described in Embodiment 1. More specifically, the registration unit 149 acquires the number of times that the vehicle 1 is parked by counting the number of times of parking for each position in the parking history information 162 as with Embodiment 1. In addition, the registration unit 149 registers the position of a parking space, in which the vehicle 1 is parked a number of times equal to or greater than the second threshold value, in the storage unit 160 as the parking space information 1161 such that the larger the number of times that the vehicle 1 is parked in the specific parking space within the predetermined past period of time is, the higher the priority rank given to the specific parking space is.

In addition, the registration unit 149 may periodically update the registered priority ranks of the specific parking spaces when the parking history information 162 is updated.

In addition, the determination unit 145 in the present embodiment performs the determination on whether the detected parking space is the specific parking space, in the order starting from a specific parking space of which the priority rank registered in the parking space information 1161 is high. As with Embodiment 1, the conditions for determining that the detected parking space is the specific parking space are that the second distance is equal to or smaller than the first threshold value and that the road surface letter in the detected parking space coincides with the road surface letter in the specific parking space which is included in the parking space information 1161.

In addition, the display process unit 147 in the present embodiment has a function of performing highlighted display in a stepwise manner according to the priority ranks set in the parking space information 1161 in addition to the function as described in Embodiment 1. For example, the display process unit 147 makes lines of a highlighted frame thicker for a higher priority rank or makes the color of a highlighted frame different for each priority rank. The stepwise highlighted display according to the priority rank is merely a modification example of highlighted display according to the priority level and the highlighted display is not limited to this. For example, the display process unit 147 may display a number indicating a priority rank, a letter indicating a priority rank, or the like in an area of a parking space determined as the specific parking space on the vicinity image.

Figure 9:
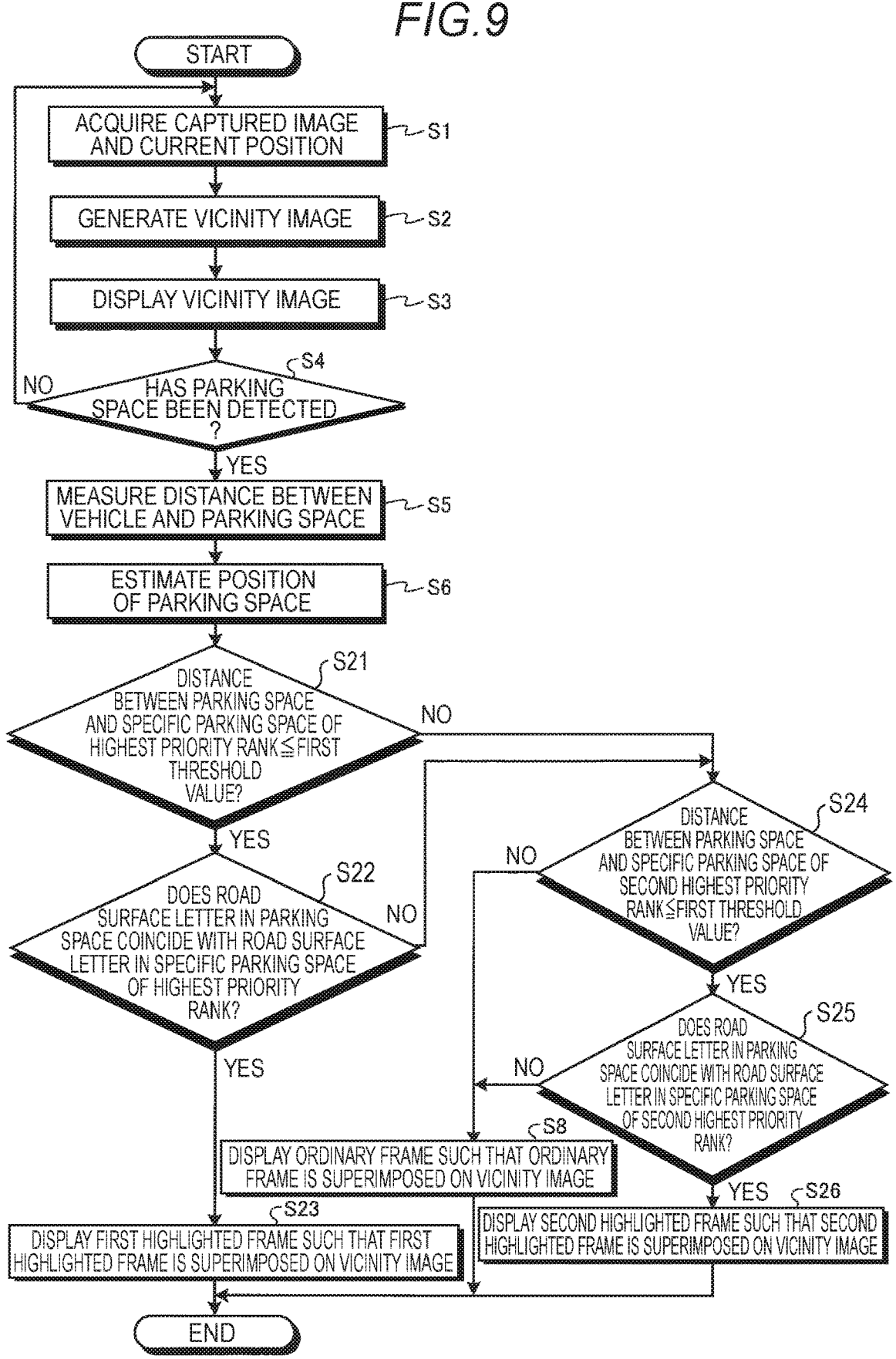
FIG. 9 is a flowchart illustrating an example of the procedure of a parking space display process according to Embodiment 2.

Next, the parking space display process in the present embodiment according to the ECU 14 configured as described above will be described. FIG. 9 is a flowchart illustrating an example of the procedure of a parking space display process according to the present embodiment. In the flowchart, the processes from S1 in which the captured image and the current position are acquired to S6 in which the position of the detected parking space is estimated are the same as those in Embodiment 1.

Next, the determination unit 145 determines whether a distance (second distance having highest priority rank) between the position of the parking space which is estimated by the estimation unit 144 and the position of the specific parking space of the highest priority rank which is included in the parking space information 1161 is equal to or smaller than the first threshold value (S21).

In a case where the second distance of the highest priority rank is equal to or smaller than the first threshold value (S21 "Yes"), the determination unit 145 determines whether a road surface letter written on a road surface of the detected parking space coincides having the road surface letter in the specific parking space with the highest priority rank which is included in the parking space information 1161 (S22).

In a case where the road surface letter written on the road surface of the detected parking space coincides with the road surface letter in the specific parking space of the highest priority rank (S22 "Yes"), the determination unit 145 determines that the detected parking space is the specific parking space of the highest priority rank. In this case, the display process unit 147 causes a highlighted frame, of which the degree of highlighting is greatest and which represents the parking space determined as the specific parking space of the highest priority rank, to be displayed such that the highlighted frame is superimposed on the vicinity image displayed on the display device 8 (S23). In the present embodiment, the highlighted frame of which the degree of highlighting is greatest and which represents the parking space determined as the specific parking space of the highest priority rank will be referred to as a first highlighted frame.

Figure 10:
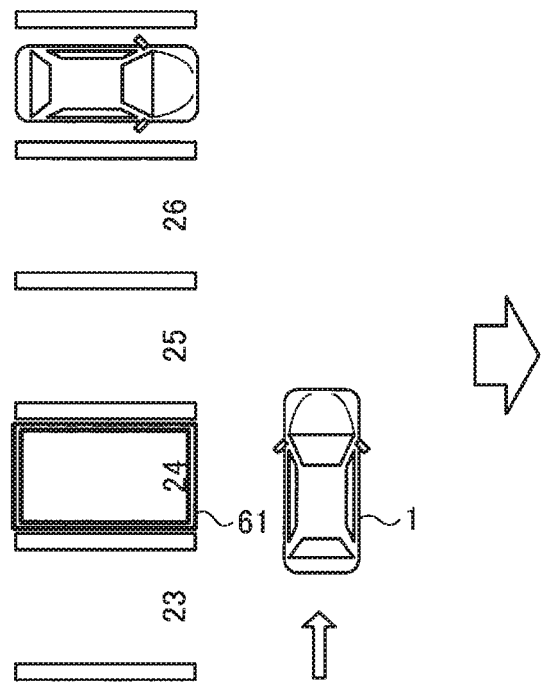
FIG. 10 is a view illustrating an example of the way in which a frame is displayed while being superimposed on a vicinity image according to Embodiment 2.
Figure 10:
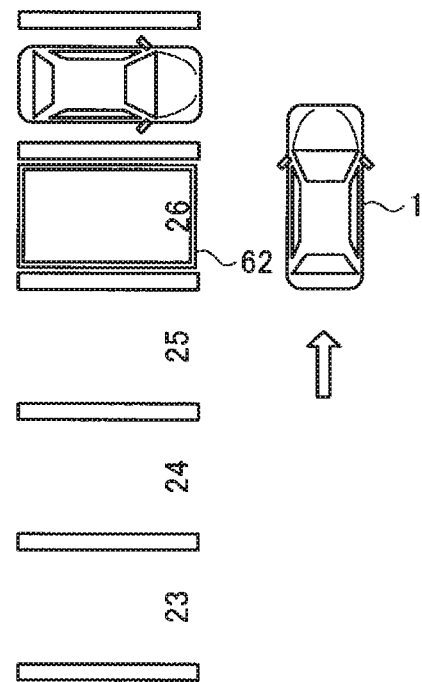

FIG. 10 is a view illustrating an example of the way in which a frame is displayed while being superimposed on the vicinity image in the present embodiment. In an example illustrated in (a) of FIG. 10, the parking space detected beside the vehicle 1 is the specific parking space of the highest priority rank. In this case, as illustrated in (a) of FIG. 10, the display process unit 147 causes a first highlighted frame 61 to be displayed such that the first highlighted frame 61 is superimposed on the vicinity image.

Referring again to the flowchart in FIG. 9, in a case where the second distance of the highest priority rank is equal to or smaller than the first threshold value (S21 "No"), the determination unit 145 determines that the detected parking space is not the specific parking space of the highest priority rank. In this case, the determination unit 145 determines whether a distance (second distance having second highest priority rank) between the position of the parking space which is estimated by the estimation unit 144 and the position of the specific parking space of the second highest priority rank which is included in the parking space information 1161 is equal to or smaller than the first threshold value (S24).

In a case where the second distance of the second highest priority rank is equal to or smaller than the first threshold value (S24 "Yes"), the determination unit 145 determines whether a road surface letter written on a road surface of the detected parking space coincides with the road surface letter in the specific parking space with the second highest priority rank which is included in the parking space information 1161 (S25).

In a case where the road surface letter written on the road surface of the detected parking space coincides with the road surface letter in the specific parking space of the second highest priority rank (S25 "Yes"), the determination unit 145 determines that the detected parking space is the specific parking space of the second highest priority rank. In this case, the display process unit 147 causes a highlighted frame, of which the degree of highlighting is second greatest and which represents the parking space determined as the specific parking space of the second highest priority rank, to be displayed such that the highlighted frame is superimposed on the vicinity image displayed on the display device 8 (S26). In the present embodiment, the highlighted frame of which the degree of highlighting is second greatest and which represents the parking space determined as the specific parking space of the second highest priority rank will be referred to as a second highlighted frame.

In an example illustrated in (b) of FIG. 10, the parking space detected beside the vehicle 1 is the specific parking space of the second highest priority rank. In this case, as illustrated in (b) of FIG. 10, the display process unit 147 causes a second highlighted frame 62 to be displayed such that the second highlighted frame 62 is superimposed on the vicinity image. The way in which the highlighted frames are displayed is not limited to this as long as the second highlighted frame 62 is not highlighted more than the first highlighted frame 61 and is highlighted more than the ordinary frame 50.

Referring again to the flowchart in FIG. 9. In a case where the road surface letter written on the road surface of the detected parking space does not coincide with the road surface letter in the specific parking space of the highest priority rank (S22 "No"), the determination unit 145 determines that the detected parking space is not the specific parking space of the highest priority rank. In this case, the display process unit 147 executes a process in 324.

In addition, in a case where the second distance of the second highest priority rank is greater than the first threshold value (S24 "No) or the road surface letter written on the road surface of the detected parking space does not coincide with the road surface in the specific parking space of the second highest priority rank (S25 "No), the determination unit 145 determines that the detected parking space is not the specific parking space of the second highest priority rank. In this case, the display process unit 147 causes the ordinary frame 50 to be displayed such that the ordinary frame 50 is superimposed on the vicinity image as with S8 in Embodiment 1.

In the present embodiment, the processes performed by the determination unit 145 are S21 to S25. In a case where a larger number of specific parking spaces are included in the parking space information 1161, the processes are repeated corresponding to the number of specific parking spaces. Alternatively, the determination unit 145 may perform the determination for specific parking spaces of a specific parking space of the highest priority rank to a specific parking space of a predetermined priority rank from among the specific parking spaces included in the parking space information 1161.

As described above, according to the ECU 14 in the present embodiment, a highlighting method is changed according to the priority level. Therefore, it is possible to achieve an effect of making the user able to more flexibly select the target parking space in accordance with a situation in addition to the effect of Embodiment 1.

For example, there may be a parking space where a user frequently parks a vehicle for the reason of convenience or the like although a parking space where the user can park the vehicle is not designated. For example, a parking lot as described above is, a parking lot in a supermarket, a parking lot in a public facility or the like. In this case, according to the ECU 14 in the present embodiment, even when the specific parking space of the highest priority rank is occupied by other vehicles, the user can locate a specific parking space of the second highest priority rank. In addition, according to the ECU 14 in the present embodiment, the highlighting method is changed according to the priority level. Therefore, in a case where a specific parking space of the second or subsequent priority rank is detected first, the user can figure out that there is a specific parking space of which the priority rank is higher than that of the specific parking space of the second or subsequent priority rank.

In addition, according to the ECU 14 in the present embodiment, the specific parking spaces are registered in the storage unit 160 such that the larger the number of times that the vehicle 1 is parked in a specific parking space within a predetermined past period of time, the higher the priority level given to the specific parking space is. Accordingly, it is possible to appropriately set priority levels based on history in the past without the user manually setting the priority levels. Therefore, according to the ECU 14 in the present embodiment, it is possible to reduce a user's burden for an operation.

In the present embodiment, the priority levels of the specific parking spaces in the parking space information 1161 are set by the registration unit 149. Furthermore, the reception unit 148 may be configured to receive a user's operation of setting and changing the priority ranks.

Embodiment 3

In Embodiments 1 and 2, only a frame representing one parking space positioned beside the vehicle 1 is displayed. However, in the present embodiment, a plurality of frames representing parking spaces are displayed.

The configuration of the vehicle 1 in the present embodiment, the hardware configuration of the vehicle control system 100 including the ECU 14 in the present embodiment, and the mechanical configuration of the ECU 14 in the present embodiment are the same as the configurations in Embodiment 1, which have been described with reference to FIGS. 1 to 3.

Figure 11:
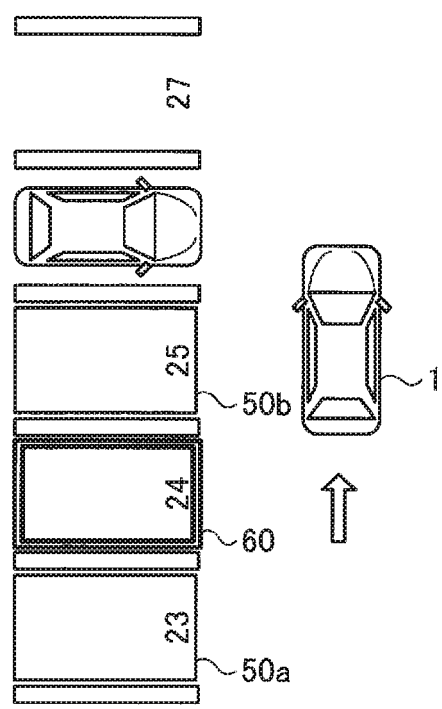
FIG. 11 is a view illustrating an example of the way in which a frame is displayed while being superimposed on a vicinity image according to Embodiment 3.

FIG. 11 is a view illustrating an example of the way in which a frame is displayed while being superimposed on the vicinity image in the present embodiment. As illustrated in FIG. 11, the display process unit 147 may cause the highlighted frame 60 that represents a specific parking space positioned diagonally behind the vehicle 1 and an ordinary image 50a that represents a parking space to be continuously displayed on the vicinity image in addition to an ordinary image 50b that represents a parking space positioned beside the vehicle 1. For example, the display process unit 147 may continue to cause a frame to be displayed until the vehicle 1 is separated from the parking space by a predetermined distance or more. The predetermined distance may be a distance for which the route calculation unit 150 can generate a moving route to a parking space from the vehicle 1. Alternatively, since a displayed area in the vicinity image displayed on the display device 8 is changed as the vehicle 1 moves, the display process unit 147 may continue to cause a frame that represents a parking space to be displayed as long as the frame is in the displayed area in the vicinity image.

In addition, the reception unit 148 according to the present embodiment receives an operation of selecting any of parking spaces represented by frames displayed on the vicinity image as the target parking space. For example, in a case where any of frames displayed on the display device 8 is pressed by the user, the reception unit 148 receives the user's operation as an operation of selecting a corresponding parking space as the target parking space. A method of selecting the target parking space is not limited to this.

In the present embodiment, a process of displaying a frame that represents a parking space is the same as the parking space display process in Embodiment 1, which has been described with reference to FIG. 6.

As described above, according to the ECU 14 in the present embodiment, a plurality of frames representing parking spaces are displayed on the vicinity image. Therefore, it is possible to achieve an effect of further improving the convenience in selecting the target parking space in addition to the effect of Embodiment 1.

For example, according to the ECU 14 in the present embodiment, a frame is continuously displayed. Therefore, even when the vehicle 1 passes an area ahead of a specific parking space, the user can select the specific parking space as the target parking space without backing the vehicle 1.

A parking assist device according to an aspect of this disclosure includes a storage unit that stores a position of a specific parking space which is one of parking spaces where a vehicle is capable of being parked; a detection unit that detects a parking space from a captured image which is obtained by imaging the vicinity of the vehicle by an imaging device; a determination unit that determines that the detected parking space is the specific parking space in a case where a distance between the position of the detected parking space and the position of the specific parking space is equal to or smaller than a first threshold value; and a display process unit that causes the detected parking space to be displayed on a display unit while being highlighted in a case where it is determined that the detected parking space is the specific parking space. Therefore, with the parking assist device according to the aspect, for example, it is possible to prevent a user from erroneously selecting a target parking space.

The parking assist device may further include, for example, a reception unit that receives an operation of inputting the position of the specific parking space and the storage unit may store the position of the specific parking space which is received by the reception unit. Therefore, with the parking assist device according to the aspect, for example, it is possible to set a parking space as the specific parking space in accordance with the desire of the user.

The parking assist device may further include, for example, a registration unit that registers the position of a parking space, in which the vehicle is parked a number of times equal to or greater than a second threshold value within a predetermined past period of time, in the storage unit as the position of the specific parking space. Therefore, with the parking assist device according to the aspect, for example, it is possible to register the specific parking space without a registration operation performed by the user and thus a load on the user can be reduced.

In the parking assist device, for example, the storage unit may further store a road surface letter written on a road surface of the specific parking space. In addition, the detection unit may further detect a road surface letter written on a road surface of the parking space from the captured image. In addition, the determination unit may determine that the detected parking space is the specific parking space in a case where the distance between the position of the detected parking space and the position of the specific parking space is equal to or smaller than the first threshold value and the road surface letter written on the road surface of the detected parking space coincides with the road surface letter written on the road surface of the specific parking space. Therefore, with the parking assist device according to the aspect, for example, it is possible to determine whether the detected parking space is the specific parking space with higher accuracy.

In the parking assist device, for example, the storage unit may store a plurality of the specific parking spaces such that each of the plurality of specific parking spaces is correlated with a priority level and the display process unit may change a highlighting method according to the priority level. Therefore, with the parking assist device according to the aspect, it is possible for the user to more flexibly select the target parking space in accordance with a situation.

In the parking assist device, for example, the registration unit may register the specific parking spaces in the storage unit such that the larger the number of times that the vehicle is parked in the specific parking space within the predetermined past period of time is, the higher the priority level given to the specific parking space is. Therefore, with the parking assist device according to the aspect, for example, it is possible to reduce a user's burden for an operation.

In the parking assist device, for example, the display process unit may cause a plurality of the parking spaces to be displayed on the display unit, the plurality of parking spaces being detected by the detection unit, and the parking assist device may further include a reception unit that receives an operation of selecting any of the plurality of parking spaces as a target position to which the vehicle is moved and at which the vehicle is parked.

In the parking assist device, for example, the display process unit causes the parking space to be continuously displayed until the vehicle is separated from the parking space displayed on the display unit by a predetermined distance or more.

Hereinabove, the embodiments of this disclosure have been described. However, the embodiments and the modification example above are merely an example and are not intended to limit the scope of the disclosure. The embodiments and the modification example above can be implemented in various forms other than above and various kinds of omission, substitution, combination, and modification can be made without departing from the spirit of the disclosure. In addition, a configuration or a shape in each embodiment and each modification example may be partially exchanged with each other.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A parking assist device comprising:
a storage unit that stores a position of a specific parking space which is one of parking spaces where a vehicle is capable of being parked;
a detection unit that detects a parking space from a captured image which is obtained by imaging the vicinity of the vehicle by an imaging device;
a determination unit that determines that the detected parking space is the specific parking space in a case where a distance between the position of the detected parking space and the position of the specific parking space is equal to or smaller than a first threshold value;
a display process unit that causes the detected parking space to be displayed on a display unit while being highlighted in a case where it is determined that the detected parking space is the specific parking space; and
a reception unit that receives an operation of inputting the position of the specific parking space and a user's operation of registering the specific parking space;
wherein the storage unit stores the position of the specific parking space which is received by the reception unit.

2. The parking assist device according to claim 1, further comprising:
a registration unit that registers the position of a parking space, in which the vehicle is parked a number of times equal to or greater than a second threshold value within a predetermined past period of time, in the storage unit as the position of the specific parking space.

3. The parking assist device according to claim 1,
wherein the storage unit further stores a road surface letter written on a road surface of the specific parking space,
the detection unit further detects a road surface letter written on a road surface of the parking space from the captured image, and
the determination unit determines that the detected parking space is the specific parking space in a case where the distance between the position of the detected parking space and the position of the specific parking space is equal to or smaller than the first threshold value and the road surface letter written on the road surface of the detected parking space coincides with the road surface letter written on the road surface of the specific parking space.

4. The parking assist device according to claim 2,
wherein the storage unit stores a plurality of the specific parking spaces such that each of the plurality of specific parking spaces is correlated with a priority level, and
the display process unit changes a highlighting method according to the priority level.

5. The parking assist device according to claim 4,
wherein the registration unit registers the specific parking spaces in the storage unit such that the larger the number of times that the vehicle is parked in the specific parking space within the predetermined past period of time is, the higher the priority level given to the specific parking space is.

6. The parking assist device according to claim 1,
wherein the display process unit causes a plurality of the parking spaces to be displayed on the display unit, the plurality of parking spaces being detected by the detection unit, and
the parking assist device further comprises a reception unit that receives an operation of selecting any of the plurality of parking spaces as a target position to which the vehicle is moved and at which the vehicle is parked.

7. The parking assist device according to claim 1,
wherein the display process unit causes the parking space to be continuously displayed until the vehicle is separated from the parking space displayed on the display unit by a predetermined distance or more.

* * * * *